J. P. SHUKIS.
DIAPHRAGM OPERATING ATTACHMENT FOR CAMERAS.
APPLICATION FILED OCT. 26, 1911.
1,018,635.
Patented Feb. 27, 1912.
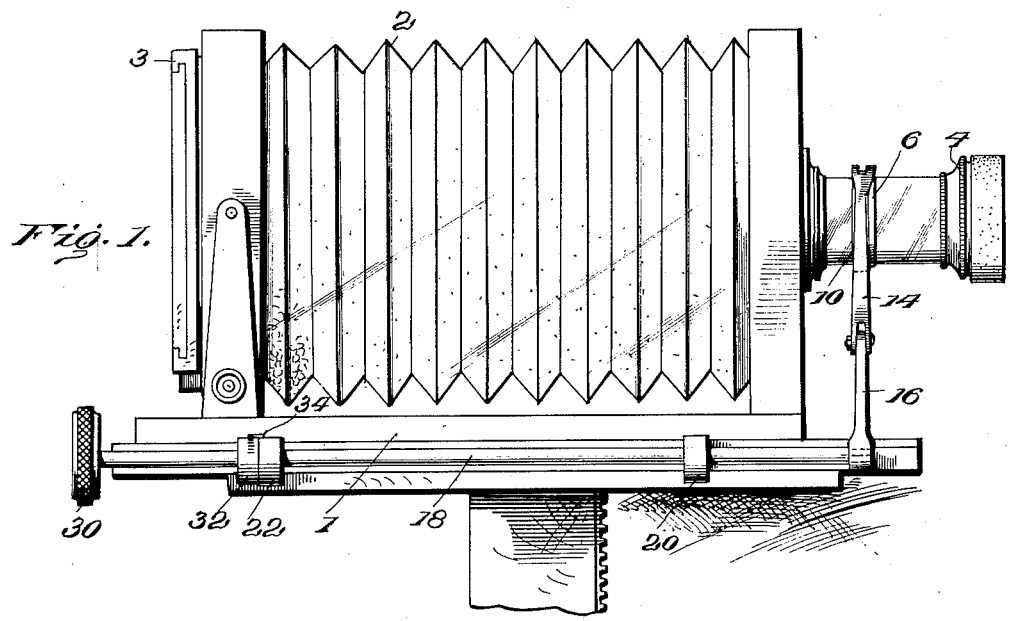
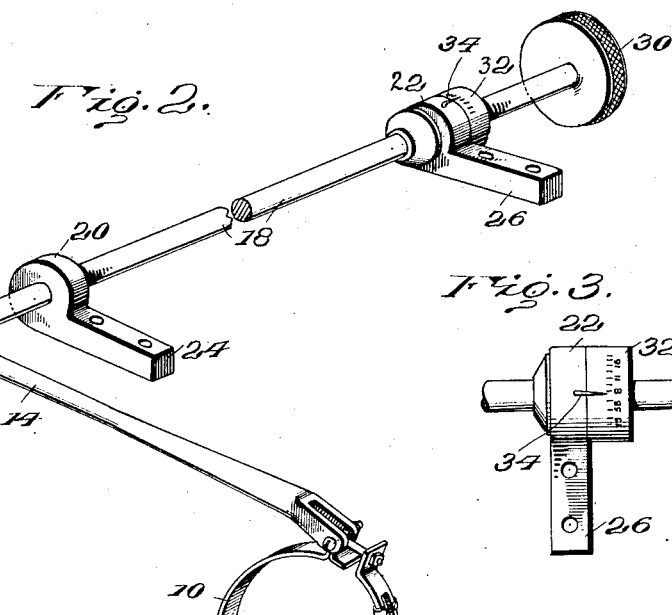
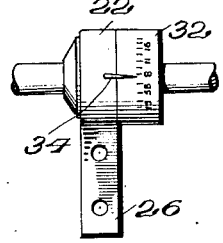
WITNESSES:
INVENTOR
Joseph P. Shukis
BY
Robertson & Johnson
Attorneys

UNITED STATES PATENT OFFICE

JOSEPH P. SHUKIS, OF WILKES-BARRE, PENNSYLVANIA.

DIAPHRAGM-OPERATING ATTACHMENT FOR CAMERAS.

1,018,635.   Specification of Letters Patent.   Patented Feb. 27, 1912.

Application filed October 26, 1911. Serial No. 656,857.

*To all whom it may concern:*

Be it known that I, JOSEPH P. SHUKIS, a Lithuanian, and subject of the Czar of Russia, now residing in Wilkes-Barre, in the county of Luzerne and State of Pennsylvania, United States of America, have invented certain new and useful Improvements in Diaphragm-Operating Attachments for Cameras, of which the following is a specification.

This invention relates to improvements in photographic cameras and more particularly in means for automatically opening and closing the diaphragm, so that the camera may be "stopped" at the same time it is being focused, thus avoiding the necessity in studio cameras, having unusually long bellows, of the operator throwing aside his focusing cloth and going around to the front of the camera to "stop" the same.

The invention consists in the simple device shown, in its preferable embodiment, in the accompanying drawings and as hereinafter more particularly described and claimed.

In the aforesaid drawings: Figure 1 is a side elevation of a camera having my invention applied thereto. Fig. 2 is a perspective view of the novel parts detached. Fig. 3 is a detail.

Referring now to the details of the drawings by numerals: 1 designates the usual camera stand with the bellows 2, plate holding and focusing means 3, lens holder 4 and the diaphragm stopping ring 6.

As all users of cameras are aware, the diaphragms are opened or closed by means of the rotary movement of the ring 6, the movement of said ring by the operator in one direction closing the diaphragm and making the opening smaller, and the movement of the ring in the opposite direction making the opening larger. In the preferable embodiment of my invention I employ a ring clamp 10 which is designed to be secured to the diaphragm ring 6, this ring clamp being adjustable so that it may be expanded or contracted to suit different sizes of diaphragm rings and having a wing nut 12 by which the ring may be clamped to secure it to the ring on which it is to be used. This ring clamp is pivotally secured to one end of a connecting arm 14 shown best in Fig. 2 and the other end of this arm is, in turn, secured to a crank arm 16; the latter being secured to one end of a rock shaft 18 journaled in any desirable way but preferably in two bearings 20 and 22 formed on two cleats 24 and 26 which may be screwed to any part of the camera. The rear end of the rock shaft 18 has secured to it a thumb disk 30 which when the device is secured to the camera is just in the rear of the focusing glass 3 so that the operator may grasp the thumb disk 30 and rotate the rock shaft 18 to adjust the diaphragm, without removing his head from under the focusing cloth. Thus the operator is enabled to focus the camera and simultaneously adjust the diaphragm, without being compelled to remove his head from under the focusing cloth and walk around the camera stand to the front of the camera to rotate the diaphragm ring 6 by hand.

In order to make the device still more convenient and provide a positive means of permitting the operator to know just which stop he is employing, I secure to the rock shaft 18, adjacent to the bearing 22, a ring 32 which is provided with gage marks indicating the sizes of the diaphragm stops, these marks corresponding to the marks usually found on the diaphragm operating means. The bearing 22 is provided with a pointer or indicator 34 which projects over the gage ring 32 to indicate just what stop the diaphragm is set for.

From the foregoing and accompanying drawing, it will be seen that I have produced a very simple device which can easily be attached to cameras now in use whereby the operator may adjust the diaphragm with great facility at the same time that he is focusing the camera.

It is obvious that changes and modifications may be made without departing from the spirit of my invention, the scope of which is set forth by the appended claims.

What I claim as my invention is:

1. An attachment for cameras comprising means for clamping the diaphragm operating ring, and a rock shaft adapted to extend the length of the camera body and having a crank near one end connecting it with the diaphragm clamping means, said rock shaft having a part near the other end adapted to be grasped by the hand of the operator whereby when the operator grasps and rotates said shaft the rotation of the shaft, through its crank, adjusts the diaphragm, substantially as described.

2. An attachment for cameras comprising a clamping ring adapted to be clamped to a diaphragm operating ring, a rock shaft adapted to extend the length of the camera body, and a crank connecting one end of the rock shaft with the clamping ring, and a thumb disk at the other end of the rock shaft, whereby upon rotation of the thumb disk, the clamping disk is rotated through the rock shaft and the crank, substantially as described.

3. An attachment for cameras comprising means for clamping the diaphragm operating ring, a rock shaft adapted to extend the length of the camera body and having a crank connecting it with the diaphragm clamping means, bearings for said shaft adapted to be secured to the camera, and a gage carried by the shaft adjacent to one of said bearings, substantially as described.

4. An attachment for cameras comprising an adjustable clamping ring adapted to clamp a diaphragm operating ring, a rock shaft adapted to extend the length of the camera body, a crank and connecting means for connecting the clamp with said shaft, bearings for the shaft, a disk as 22 carried by the shaft adjacent to one of the said bearings, one of said parts, the disk or the bearing, having a pointer and the other having gage marks thereon, substantially as described.

In testimony whereof I affix my signature in presence of two witnesses.

JOSEPH P. SHUKIS.

Witnesses:
GEORGE J. RITCHIE,
SADIE RUBINSKY.